United States Patent
Wagner et al.

(10) Patent No.: US 8,659,429 B1
(45) Date of Patent: Feb. 25, 2014

(54) IN-BUILDING LOCATION SYSTEM

(75) Inventors: Ronald E. Wagner, Fleming Island, FL (US); Bryan Siegal, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 640 days.

(21) Appl. No.: 12/807,873

(22) Filed: Sep. 16, 2010

Related U.S. Application Data

(60) Provisional application No. 61/342,106, filed on Apr. 9, 2010.

(51) Int. Cl.
*G08B 13/14* (2006.01)

(52) U.S. Cl.
USPC .............. 340/572.1; 340/539.13; 340/686.1; 455/456.1; 342/357.25

(58) Field of Classification Search
USPC ......... 340/539.13, 539.22, 686.1, 689, 686.6; 455/456.1; 342/357.23, 357.4, 357.42, 342/357.44
See application file for complete search history.

(56) References Cited

U.S. PATENT DOCUMENTS

| | | | | |
|---|---|---|---|---|
| 5,583,776 A | * | 12/1996 | Levi et al. | 701/400 |
| 5,740,048 A | * | 4/1998 | Abel et al. | 701/470 |
| 6,512,478 B1 | * | 1/2003 | Chien | 342/357.25 |
| 7,388,490 B2 | * | 6/2008 | Freitag et al. | 340/572.1 |
| 7,420,510 B2 | * | 9/2008 | Kolavennu et al. | 342/465 |
| 7,463,997 B2 | * | 12/2008 | Pasolini et al. | 702/160 |
| 8,180,379 B2 | * | 5/2012 | Forstall et al. | 455/456.6 |
| 8,187,182 B2 | * | 5/2012 | Kahn et al. | 600/300 |
| 8,204,684 B2 | * | 6/2012 | Forstall et al. | 701/433 |
| 2005/0143916 A1 | * | 6/2005 | Kim et al. | 701/214 |
| 2006/0052132 A1 | * | 3/2006 | Naukkarinen et al. | 455/556.1 |
| 2006/0171538 A1 | * | 8/2006 | Larson et al. | 380/270 |
| 2007/0254676 A1 | * | 11/2007 | Pedigo et al. | 455/456.6 |
| 2010/0151996 A1 | * | 6/2010 | Alten et al. | 482/8 |

* cited by examiner

*Primary Examiner* — Brian Zimmerman
*Assistant Examiner* — Omer S Khan
(74) *Attorney, Agent, or Firm* — Daniel J. Long

(57) ABSTRACT

An in-building location system for detecting the location of individuals or items within a building utilizes a scanner carried by an individual or an item and RFID tags to provide fiducial points for assisting in the location process, with the tags being scanned by the scanner and in which tag proximity to a scanner provides for accurate in-building location. Accurate location of the scanner relative to multiple tags may be ascertained utilizing triangulation.

16 Claims, 2 Drawing Sheets

IN-BUILDING LOCATION SYSTEM

RELATED APPLICATIONS

This Application claims rights under 35 USC §119(e) from U.S. Application Ser. No. 61/342,106 filed Apr. 9, 2010, the contents of which are incorporated herein by reference.

FIELD OF THE INVENTION

This invention relates to in-building location systems and more particularly to the utilization of RFID tags to provide fiducial points to assist in locating an individual or item within a building.

BACKGROUND OF THE INVENTION

One of the largest problems in locating people or devices within a building is the precise location in a building where GPS coverage is not available. GPS essentially stops working at the door of a building such that inside the building one does not have the ability to access satellites. This is true even for assisted GPS systems depending on how far into a building one goes. It is understood that at least at some points in a building GPS signals are too attenuated to be usable. Therefore one can not get a precise in-building location utilizing the GPS system.

While triangulation be utilized from the cell towers, one can arguably get within 100 feet, however 100 feet is clearly insufficient and what is required is plus or minus two feet to properly locate devices or human beings within a building.

SUMMARY OF INVENTION

It is part of the subject invention to provide in-building location of people or devices utilizing RFID tags that have been stationed within the building at points where the location of each of the tags is known. If an individual or device is carrying a module that communicates with the RFID tags, when the hand-carried module is within proper proximity, the RFID tag will transmit to the module the fact of the proximity and the ID of the tag. Since the tag is pre-located one at least knows within a certain proximity the module is within the proximity range of the RFID tag that is serving as a fiducial point.

However, proximity alone may not yield the required location accuracy. If the RFID tags are arranged to transmit to each other in a network then if the hand-carried module is within the proximity of more than one tag then triangulation between the tags is possible based on the location of the tags, and for instance either the strength of the signal received by the tag which is range dependent, or an algorithm is utilized to calculate the position of the hand-carried module between a number of tags.

In one embodiment while the RFID tags may be pre-located and therefore have a known latitude and longitude, it may be possible to lay down a bread crumb of RFID tags as an individual moves into a building and then drops the RFID tags along the track that he takes through the building. Since the location of the individual can be determined by the GPS system as the person enters the portal of the building, the tags can be provided with inertial navigation systems including for instance accelerometers, magnetometers and for instance pedometers, along with either a compass or other means of detecting the direction of the acceleration so as to update the tags latitude and longitude based on dead reckoning from the initial latitude and longitude provided by GPS, coordinates at the entrance to the building.

In another embodiment, one could provide the module carried by the individual or device with the aforementioned inertial guidance and then correct the location provided by the inertial guidance information from fiducial RFID tags that have been pre-located within the building.

In summary, in in-building location system for detecting the location of individuals or items within a building utilizes a scanner carried by an individual or an item and RFID tags to provide fiducial points for assisting in the location process, with the tags being scanned by the scanner and in which tag proximity to a scanner provides for accurate in-building location. Accurate location of the scanner relative to multiple tags may be ascertained utilizing triangulation.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
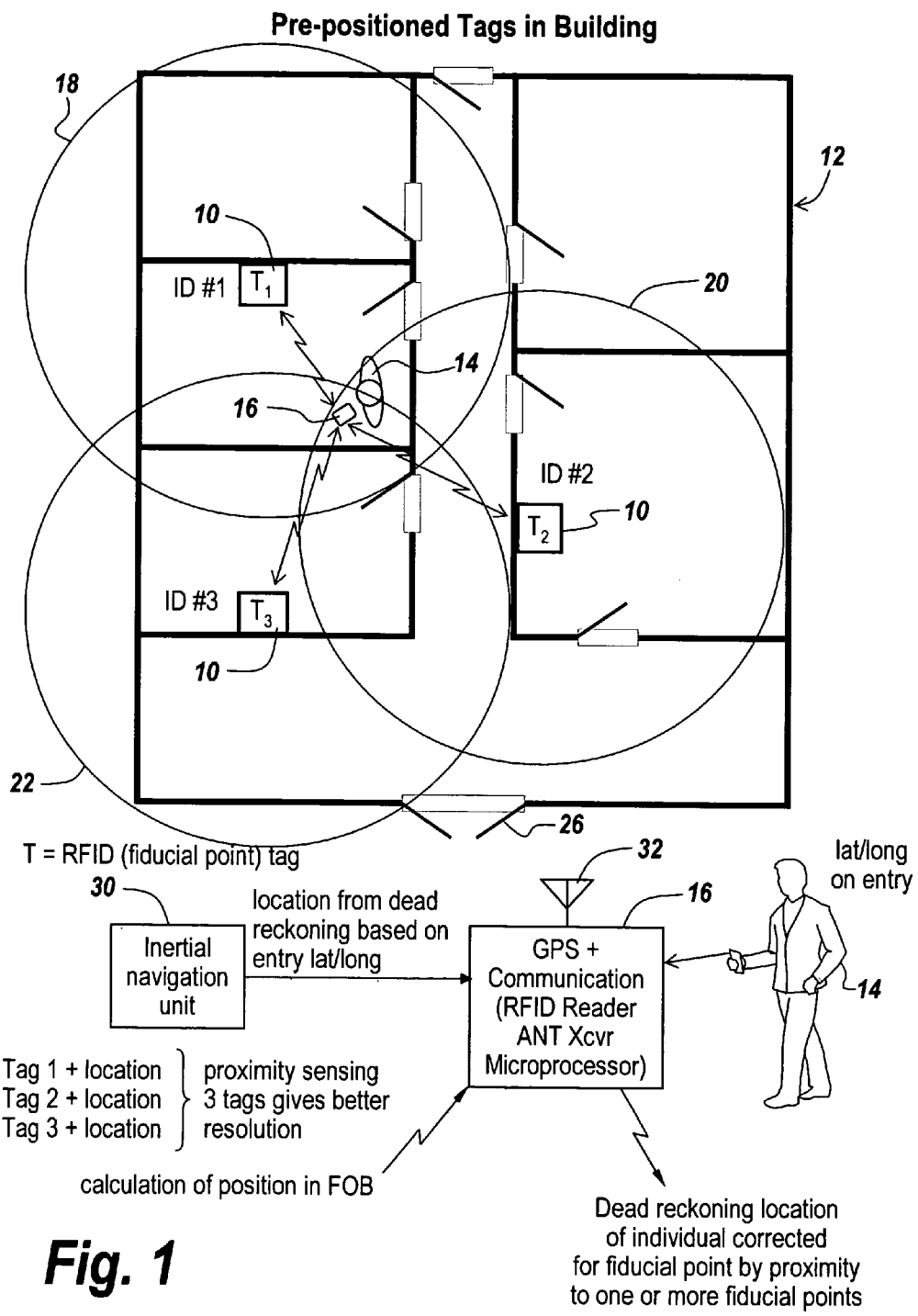
FIG. 1 is a diagrammatic illustration of the utilization of pre-positioned RFID tags used to locate an individual or device therebetween, also showing providing inertial navigation units to each of the pre-positioned tags to provide exact location of the tags within the building.

As can be seen from FIG. 1, in one embodiment of the subject invention tags 10, each having the ability to identify itself and its location are pre-positioned within a building 12.

An individual 14 having a module 16 that can interrogate the tags and derive information therefrom is shown at various distances from tags 10, here labeled $T_1$, $T_2$ and $T_3$. Note the module may be a small hand carried fob or like device. The range of each of the tags is respectively illustrated by circles 18, 20 and 22.

If the tags are to be proximity sensors only, then this range can be indeed quite short, i.e. two feet such that the proximity of handheld module 16 to any one of the tags indicates the location of the handheld module to within two feet.

It is important in this embodiment that the tags be pre-located and have the latitude and longitude of the tags embedded in the tags so that they can report their location to module 16 which interrogates it. However, short range tags may not cover enough area and widening the range results in range overlap. One can then use range measurements or triangulation between tags to ascertain location.

Note that for triangulation purposes, when utilizing multiple RFID tags that it is convenient that the RFID tag transceivers operate on the same frequency so that simultaneous range measurements can be made.

Another way to communicate is to transmit to as many RFID tags that can hear the transmission from module 16 and then triangulate on the basis of the strength of the signal and time domain reflectometry from the individual RFID tags to the module.

A further way to establish the location of an individual or device within a building is to detect the GPS location of an individual 14 who carries module 16 which includes a GPS receiver when the individual enters portal 26 of building 12.

The location of the individual in the building can be established by connecting an inertial navigation unit 30 to module 16 such that as the person moves through the building inertial navigation techniques can be used to establish the latitude and longitude of the individual or module within the building. It is noted that this inertial navigation position can be corrected for proximity to the fiducial points established by the placement of the RFID tags throughout the building.

Note that the calculation of position is in module 16 or more specifically in a fob in which a GPS receiver and communications are located. The module also has an RFID reader and may include an ANT transceiver as well as a microprocessor. Once location has been calculated, the location may be transmitted by for instance antenna 32 to the outside world to establish the location of the device or individual within the building.

It is noted that proximity sensing utilizing three tags may give a better resolution than dead reckoning or any of the inertial navigation techniques that might be employed, thus to increase the accuracy of the in-building position.

Figure 2:
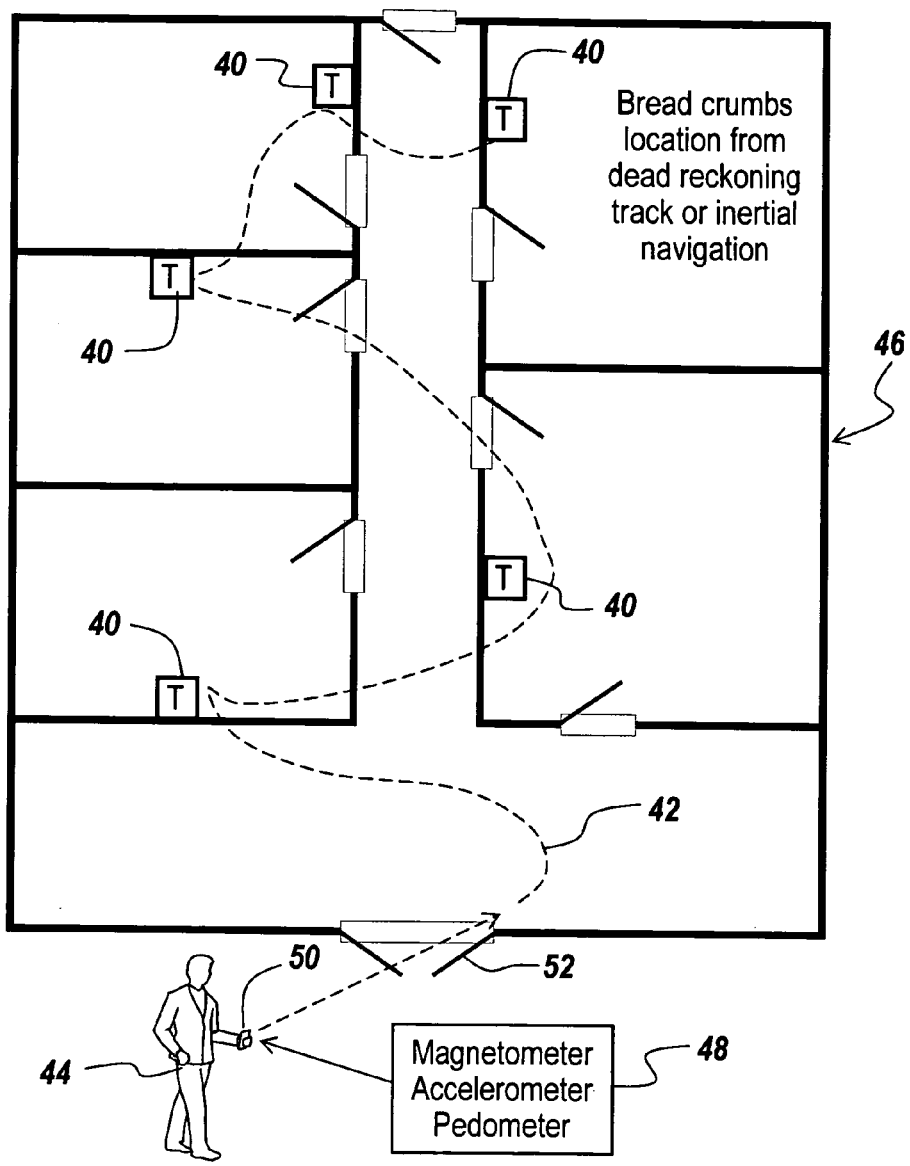
FIG. 2 is a diagrammatic illustration illustrating a bread crumb embodiment of the subject invention in which tags are dropped along a path that an individual takes from outside a building to locations within the building.

Referring now to FIG. 2, rather than pre-positioning RFID tags in a building with known latitude and longitude positions, tags 40 may be deposited or dropped along a bread crumb path 42 traversed by an individual 44 as the individual enters building 46 and walks through it.

Each of the tags is provided with a magnetometer, accelerometer and/or pedometer 46 so as to establish the position of the bread crumbs, namely RFID tags 40.

From the outputs of the magnetometer, accelerometer and pedometer one can establish the location of the tags within building 46 so that when these tags are read out by a module 50 held by the individual which has the aforementioned communications capability, the position of the individual can be accurately ascertained due to the information transmitted from the tags to the module.

Thus, in order to establish the position of the bread crumbs one requires in each of the RFID tags a distance sensor which could for instance be the number of steps taken by an individual once he passes portal 52 of building 46. Alternatively, the distance may be computed by accelerometer outputs and differentiation techniques.

Secondly, the direction of the tag or sensor can be established by a magnetometer that is on board. Finally, when the tag is appropriately positioned the calculated latitude and longitude can be written into the tag when it is deployed.

The result is that by proximity to a particular tag individual 44 can establish his or her position relative to the bread crumb tags whose positions have been established through a dead reckoning track or inertial navigation.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of locating an individual or object within a building as the individual proceeds through the building, comprising the steps of:

locating RFID tags within the building, the RFID tags being carried by the individual as the individual proceeds along a path through the building and being dropped along a path as the individual proceeds through the building; and detecting, through the use of a proximity measuring module having an RFID reader the proximity of an individual to RFID tags having known locations, each of the RFID tags being provided with an inertial navigation unit to be able to update a new position of the RFID tag along the path, the position of each of the dropped RFID tag is provided by dead reckoning based on the location of the individual at the entrance of the building through which the individual passes and the number of steps of the individual from the entrance, the dead reckoning including counting the numbers of steps of the individual as he proceeds along the path.

2. The method of claim 1, wherein the RFID tags communicate between themselves in a network and wherein the distance from each of the RFID tags to the module is determined, thereby to permit determining by proximity to multiple RFID tags the location of the module.

3. The method of claim 1, wherein the RFID tags are pre-positioned at known locations within the building.

4. The method of claim 1, wherein the inertial navigation unit includes an accelerometer.

5. The method of claim 1, wherein the inertial navigation unit includes a magnetometer.

6. The method of claim 1, wherein the inertial navigation unit includes a pedometer.

7. The method of claim 1, wherein the inertial navigation unit includes a compass.

8. The method of claim 1, wherein the position of a RFID tag along the path includes establishing the distance and direction of a RFID tag from an initial position at the start of the path.

9. The method of claim 1, wherein the initial position of a RFID tag is determined by GPS coordinates when an individual carrying a number of the RFID tags enters the portal of a building.

10. The method of claim 8, wherein the initial position along the path includes derivation from GPS coordinates.

11. The method of claim 1, and further including the step of providing the module with an inertial guidance capability and a GPS receiver for ascertaining the position of the module when entering the building, and;

correcting the position of the module ascertained by the inertial navigation system and GPS based on proximity to the RFID tags.

12. The method of claim 1, wherein the module and RFID tags communicate on the same frequency.

13. The method of claim 1, wherein each of the RFID tags identifies itself and its location.

14. The method of claim 13, wherein the identity and location of a RFID tag is transmitted from the RFID tags to the module when the RFID tag is read out by the module.

15. The method of claim 1, wherein the location of the module is determined by time domain reflectometry.

16. The method of claim 1, wherein the module is configured as a handheld key fob size device.

* * * * *